United States Patent Office
3,548,024
Patented Dec. 15, 1970

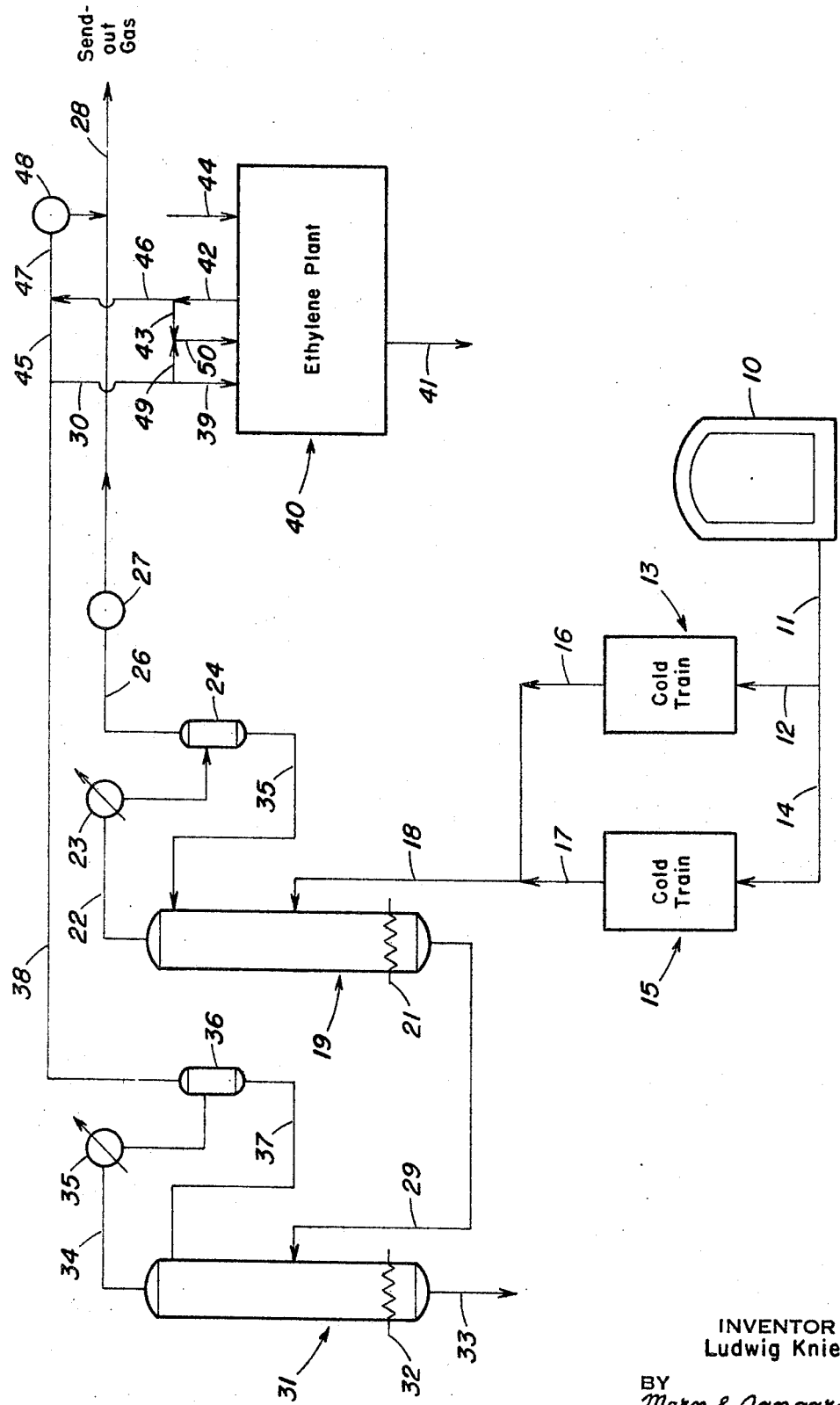

3,548,024
REGASIFICATION OF LIQUEFIED NATURAL GAS AT VARYING RATES WITH ETHYLENE RECOVERY
Ludwig Kniel, Scarsdale, N.Y., assignor to The Lummus Company, Bloomfield, N.J., a corporation of Delaware
Continuation-in-part of applications Ser. No. 316,048, Oct. 14, 1963, and Ser. No. 534,013, Mar. 14, 1966. This application June 25, 1969, Ser. No. 836,523
Int. Cl. C07c *3/08, 3/30*
U.S. Cl. 260—683          15 Claims

ABSTRACT OF THE DISCLOSURE

Liquefied natural gas is regasified and fractionated to provide a methane send-out gas and an ethane feed for a plant producing ethylene. The ethylene plant is designed to operate at an ethane feed rate corresponding to ethane recovered from the natural gas during a minimum send-out rate period and at times when the send-out rate is above the minimum, the excess ethane recovered from the natural gas is blended with an ethylene plant off-gas, containing methane and/or carbon monoxide and/or hydrogen, the blending being controlled to produce a blend having the approximate heating value of the methane send-out gas.

---

This application is a continuation-in-part of copending U.S. application Ser. No. 316,048 filed Oct. 14, 1963 and now abandoned and copending U.S. application Ser. No. 534,013 filed Mar. 14, 1966, and now U.S. Patent No. 3,456,032, granted July 15, 1969.

This invention relates generally to the year-round operation of a plant revaporizing natural gas and wherein ethane in said natural gas is recovered and converted to ethylene. More particularly, the invention relates to a method of meeting seasonal demand peaks.

In the first of the above-mentioned copending applications there is described a method of revaporizing liquefied natural gas (hereinafter referred to as "LNG") wherein an ethane fraction is separated from the gas and passed to an ethylene plant. The refrigeration requirements of the ethylene plant and of the ethane recovery plant are substantially completely met by the cold potential recovered from the LNG while effecting regasification thereof.

In the second of the above-mentioned copending applications there is described a modification of this process, wherein a propane and heavier fraction, which is the residual fraction from the ethane separation, is blended with the ethylene plant off-gas ($CH_4$, $H_2$, etc.) to give a gas having the approximate heating value of methane which is distributed as the primary send-out gas from the LNG revaporization plant. Additionally, the propane and heavier fraction (butane, etc.) can be separated into propane, butanes and pentanes plus, fraction. The propane and butane fraction may be used as LPG (liquefied petroleum gas). The pentanes plus, fraction can be disposed of as a gasoline blending component.

The regasification of LNG, however, must be effected at a variable rate, i.e., the amount of LNG to be revaporized will depend on the momentary gas demand, which varies greatly from season to season. Accordingly, the amount of ethane available to the ethylene plant is also variable and this presents problems in the ethylene plant design. Thus, for example the daily gas send-out rate during the cold season (averaged over four months of winter), in a temperate climate, may be about 2.5 times greater than the send-out rate during the warm season (averaged over four months of summer). If the ethylene plant is designed to operate at an ethane feed rate corresponding to the amount of ethane available in the LNG at a send-out rate between the two extremes, e.g., 1.35 times the minimum average send-out rate, then the ethane and cold potential available from the LNG during a period below this chosen send-out rate would be insufficient to operate the ethylene plant at the full design capacity. Thus, during a substantial part of the year, the ethylene plant is operated at below capacity, which increases overall manufacturing costs. During periods when the send-out rate is greater than the chosen send-out rate, ethane in an amount above the maximum amount for which the ethylene plant has been designed is available and for which there is no outlet. This ethane cannot be included in the send-out gas, since the heating value of the gas must remain constant.

Accordingly, an object of this invention is to provide an improved process for combining the regasification of liquefied natural gas with the production of ethylene.

Another object of this invention is to provide a process for combining the regasification of liquefied natural gas with the production of ethylene at varying gas send-out rates.

A further object of this invention is to provide a process for economically combining the regasification of liquefied natural gas with the production of ethylene that provides for varying gas send-out rates.

These and other objects will become more readily apparent from the following detailed description of the invention when read with reference to the accompanying drawing which is a simplified schematic flow diagram of an embodiment of the process of the invention.

The objects of this invention are broadly accomplished by designing the ethylene plant to operate at an ethane feed rate corresponding to the amount of ethane available from the LNG during a minimum send-out rate period, i.e. during the summer (ignoring daily fluctuations). The ethane available during periods when the send-out rate is greater than the minimum send-out rate, in excess of that required as feed to the ethylene plant, is used as fuel to the ethylene plant and/or blended with ethylene plant off-gas to provide a combined gas with the approximate heating value and density of the send-out gas for the distribution system.

More particularly, a part of the ethane available during periods of greater than the minimum send-out rate is blended in proper proportions with the ethylene plant off-gas to closely match the heat content and density of the send-out gas. The blended gas is then compressed, if necessary, and combined with the send-out gas for distribution. The off-gas from the ethylene plant is generally used to meet the fuel requirements therefor and accordingly, the remainder of the excess ethane available from the LNG is used to replace (heat value-wise) the amount of off-gas used to make the blend. Alternatively, the fuel deficiency may be made up with a fuel from an extraneous source.

The invention will be more fully described with reference to the accompanying simplified schematic flow diagram of an embodiment of the invention. It is to be understood that pumps, valves, particular equipments and the like are not shown in order to simplify the description of the embodiment and the use of these elements in appropriate places is deemed to be within the scope of one skilled in the art.

Referring to the drawing, liquefied natural gas, containing methane, ethane and heavier hydrocarbons, is withdrawn from a storage tank 10 through line 11 at a rate corresponding to the momentary demand of a gas distribution system, a rate which may be at or above the minimum send-out rate. A portion of the LNG in line 11 is passed through line 12 and the regasification plant cold train, schematically indicated as 13. The remaining portion of LNG in line 11 is passed through line 14 and the ethylene plant cold train, schematically indicated as 15. The cold trains 13 and 15, as more fully described in application Ser. No. 316,048, are utilized to recover the cold potential of the LNG and are comprised of those portions of the respective plants which require refrigeration, e.g., the reflux condensers for the fractionators in both plants. The rate of flow through cold trains 13 and 15 are suitably balanced to provide the required refrigeration for both the regasification and ethylene plants. In some cases, a portion of the LNG in line 11 may be used for cooling purposes extraneous to both the regasification and ethylene plants. As a result of the passage through cold trains 13 and 15, a portion of the LNG is vaporized and a vapor-liquid mixture of natural gas is withdrawn from cold trains 13 and 15 through lines 16 and 17, respectively.

The natural gas in lines 16 and 17 are combined in line 18 and introduced into a demethanizer 19, provided with a reboiler 21, to separate methane from ethane and heavier hydrocarbons. An overhead, primarily comprised of methane, is withdrawn from demethanizer 19 through line 22, and passed through a reflux condenser 23 to a separator 24. The condenser 23 forms a part of the regasification cold train 13, as more fully described in application Ser. No. 316,048. A condensed methane portion is withdrawn from separator 24 and passed through line 25 to demethanizer 19 to meet the reflux requirements therefor. An uncondensed portion, primarily comprised of methane, is withdrawn from separator 24 through line 26 and passed through a heat exchanger 27 wherein the vapor is superheated by indirect heat transfer with a suitable heat transfer agent. The heat exchanger 27 may be part of either the regasification or ethylene plant cold train, as described more fully in application Ser. No. 316,048. The superheated gas from the heat exchanger 27 is passed as send-out gas through line 28 to the distribution system (not shown).

A bottoms, containing ethane, propane, butanes and heavier hydrocarbons is withdrawn from demethanizer 19 through line 29 and introduced into a deethanizer 31, provided with a reboiler 32, to separate ethane from the heavier hydrocarbons. A bottoms, containing propane, butanes and heavier hydrocarbons, is withdrawn from deethanizer 31 through line 33 and passed to storage (not shown). Alternatively, the bottoms in line 33 may be passed to a depropanizer (not shown) to separate propane from butanes and heavier hydrocarbons. As a further alternative, the bottoms in line 33 may be combined with off-gas from the ethylene plant to provide a gas having the approximate heating value of methane, as described in application Ser. No. 534,013.

An overhead, primarily comprised of ethane, is withdrawn from deethanizer 31 through line 34 and passed through a reflux condenser 35 to a separator 36. The reflux condenser 35 forms a portion of the regasification plant cold train 13, as more fully described in application Ser. No. 316,048. A condensed portion is withdrawn from separator 36 through line 37 and passed to deethanizer 31 to meet the reflux requirements therefor. An uncondensed portion is withdrawn from the separator 36 through line 38 for further processing, as hereinafter more fully described.

When the send-out rate is at the minimum send-out rate, all of the ethane in line 38 is passed through line 39 to the ethylene plant, schematically indicated as 40, and provided with pyrolysis heaters, suitable fractionators and the like (all not shown), for conversion to ethylene, e.g., as described in application Ser. No. 316,048. An ethylene product is withdrawn from the ethylene plant 40 through line 41 and an ethylene plant off-gas, containing one or more of the following and generally all three: hydrogen, carbon monoxide and methane, is withdrawn therefrom through line 42. The off-gas, during this period of minimum send-out rate, is recycled through lines 43 and 50 to the ethylene plant, i.e., the heaters, to meet the fuel requirements therefor. Alternatively, fuel from an extraneous source may be provided to the ethylene plant 39 through line 44 and either all or some of the off-gas, during this period, may be combined (not shown) with the bottoms from the deethanizer 31 for use as send-out gas, as described in application Ser. No. 534,013.

When the send-out rate is above the minimum send-out, there will be an amount of ethane in line 38 which is above the amount of ethane therein during a minimum send-out rate period. The amount of ethane in line 38 corresponding to the amount of ethane present during a minimum send-out rate period is introduced into the ethylene plant 40 through line 39. Some or all of the ethane remaining in line 38 is passed through line 45 and combined with some or all of the off-gas withdrawn from the ethylene plant 40 through lines 42 and 46. As noted hereinabove, the blending of the ethane and off-gas is controlled to provide a combined gas stream in line 47 having the caloric value and density of the send-out gas in line 28. The combined stream in line 47 is compressed, if necessary, by compressor 48 and combined with the send-out gas in line 28 for passage to the distribution system (not shown).

The fuel requirements for the ethylene plant may be supplied by passing a portion of the ethane in line 38 through lines 49 and 50 to the ethylene plant 40. The quantity of ethane introduced through line 49 is used to replace (heat value-wise) the amount of off-gas passed through line 46 for blending with ethane. Thus, the fuel requirements for the ethylene plant are supplied either by the ethane alone in line 49 or by a combination of ethane in line 49 and off-gas in line 43. Alternatively, when an inexpensive fuel from an extraneous source is available, the fuel requirements for the ethylene plant may be met by introducing a fuel thereto through line 44. The entire ethane and off-gas are then combined to produce a blend having the same heat value and density as the send-out gas.

Numerous modifications of the invention are possible without departing from the scope thereof. Thus, for example, the deethanizer 31 may be omitted and the entire bottoms from the demethanizer 19 may be used as a feed to the ethylene plant 40. In such an embodiment, the ethylene plant 40 would be designed for the quantity of heavier hydrocarbons available from the liquefied natural gas at the minimum gas send-out rate. The amount of heavier hydrocarbons available in excess of this amount, during periods of greater than the minimum gas send-out rate, would be utilized to produce a blend gas and to provide fuel for the ethylene plant, as described hereinabove.

As another alternative, the process described hereinabove, may also be used to provide for daily fluctuations as well as seasonal fluctuations in the gas send-out rate. The daily fluctuations, in part, may be equalized by the "breathing" capacity of the distribution system, i.e., by permitting a resolvable change of downstream pressures in the distribution system. The daily fluctuations that cannot be provided for by the "breathing" capacity of the system may be provided for as hereinabove described with reference to seasonal fluctuations.

The above modifications and other modifications should be apparent to those skilled in the art from the teachings of the invention.

The following example is illustrative of the process of the invention but the scope of the invention is not to be limited thereby.

EXAMPLE

Table I is illustrative of the heat content and density of the pertinent gas streams used in accordance with the process of the invention.

TABLE I

| No. | Stream | Gross heat value, B.t.u./s.c.f. | Density (air=1.0) |
|---|---|---|---|
| 28 | Send-out gas (LNG demethanizer overhead). | 1,163 | .586 |
| 38 | Ethane to ethylene plant | 1,778 | 1.042 |
| 42 | Ethylene plant off-gas | 419 | .1384 |

Thus, from the values of Table I, 52.6 cubic feet of ethylene plant off-gas may be combined with 47.4 cubic feet of ethane to produce 100 cubic feet of a blend having a gross heat value of 1163 B.t.u./ft.$^3$ and a density of .57, which closely corresponds to the heat values and density of the primary send-out gas.

The following Table II is illustrative of gas rates used in accordance with the process of the invention, with the send-out rate being expressed in millions of ton-calories per hour. The send-out ratio is the ratio of the actual send-out rate to the minimum send-out rate for which the ethylene plant is designed. Thus, the minimum total gas send-out rate is .836 million of ton-calories per hour, with the send-out gas having a density of .586. The send-out ratio at minimum send-out rate is 1.0.

TABLE II

| | | Millions ton-cal./hr. | |
|---|---|---|---|
| Line | Function | Send-out ratio=1.7 | Send-out ratio=2.57 |
| 26 | Primary gas | 1.274 | 1.82 |
| 28 | Total product gas | 1.42 | 2.148 |
| 38 | Total ethane | .425 | .607 |
| 39 | Ethane for feed | .279 | .279 |
| 42 | Total off-gas | .066 | .066 |
| 46 | Off-gas for blend | .0302 | .066 |
| 47 | Blended gas | .146 | .328 |
| 43 | Off-gas for fuel | .0357 | .000 |
| 49 | Ethane for fuel | .0302 | .066 |
| 50 | Total fuel | .066 | .066 |
| 45 | Ethane for blend | .1158 | .252 |

It should be readily apparent from Table II and the detailed description hereinabove, that the ethane feed to the ethylene plant (line 39) and accordingly, the off-gas from the ethylene plant (line 42) are constant, even though the gas send-out rate varies.

The amount of ethane available from the LNG, in excess of that required for feed to the ethylene plant, varies with the send-out rate and accordingly, the amount of off-gas required for blending with the ethane also varies. Thus, at the higher send-out rate (send-out ratio 2.57), all of the off-gas is blended with the ethane, and consequently more ethane, in terms of heat value, must be used as fuel. Although all of the off-gas is used at this higher send-out rate, this higher send-out rate, given by way of illustration, is more than enough to compensate for send-out variations in temperature climates.

Table II and the detailed description of the invention hereinabove, illustrate a further advantage of the process of the invention. Thus, the primary send-out gas rate (overhead from the demethanizer 19 in line 26) need not vary by as much as the total required send-out rate to the commercial distribution system through line 28, since part of the total send-out requirements is met by the gas blend provided in line 47. Thus, although the total gas send-out rate increased by a factor of 2.57 over the minimum total gas send-out rate of .836 million of ton-calories per hour (this is also the primary gas send-out rate in line 26 at the minimum send-out rate), the primary send-out gas rate in line 26 only increases by a factor of 2.18. The gas blend in line 47 supplies the additional total send-out gas requirement.

From the above, it should be readily apparent that the regasification plant, including the demethanizer, may be designed for 85% of the maximum send-out rate, with the demethanizer being capable of operating with a turn-down ratio of about 45% of design.

The process of this invention is extremely effective for combining regasification with the production of ethylene and results in a reduction in both construction and operating costs. The ethylene plant operates at a constant rate even though the regasification plant operates at a varying rate. Moreover, the overall rate variation of the regasification plant is decreased, since a portion of the increased total gas send-out rate is provided by the gas blend.

Various changes in the details, steps, materials, and arrangements of parts, which have been herein described and illustrated in order to explain the nature of the invention, may be made by those skilled in the art within the principle and scope of the invention as defined in the appended claims.

What is claimed is:

1. In a process combining the operation of a regasification plant for liquefied natural gas with an ethylene plant wherein a send-out gas, primarily comprised of methane is provided from the natural gas and hydrocarbons heavier than methane are recovered from the natural gas, at least the ethane of said hydrocarbons being used as feed to the ethylene plant and the quantity of said heavier hydrocarbons recovered varies with the send-out rate of the gas, the improvement comprising:

(a) passing a fixed quantity of the ethane recovered from the liquefied natural gas as feed to the ethylene plant; and (b) blending at least a portion of any ethane recovered from the liquefied natural gas in excess of the fixed quantity with at least a portion of an ethylene plant off-gas, the proportions of said blend being controlled to produce a gas having the proximate heating value of the send-out gas.

2. The process as claimed in claim 1, wherein off-gas not blended with said ethane is utilized as fuel in said ethylene plant.

3. The process as claimed in claim 1, wherein the blended gas is combined with the send-out gas from the regasification plant.

4. The process as claimed in claim 1 wherein the ethylene plant off-gas not blended with ethane and a further portion of any excess ethane is utilized as fuel in the ethylene plant, said further portion of the excess ethane being provided to the ethylene plant in an amount to replace heat value-wise the amount of ethylene plant off-gas blended with ethane to produce the gas having the approximate heating value of the send-out gas.

5. The process as claimed in claim 1, wherein refrigeration requirements of said ethylene plant are supplied by the cold potential of said liquefied natural gas.

6. The process as claimed in claim 1, wherein the fixed quantity of ethane corresponds to the quantity of ethane recovered from the liquefied natural gas at minimum gas send-out rate.

7. The process as claimed in claim 1, wherein the ethane and heavier hydrocarbons recovered from the natural gas are used as feed to the ethylene plant, the quantity of ethane and heavier hydrocarbons being fixed and at least a portion of the ethane and heaveir hydrocarbons in excess of the fixed portion is blended with at least a portion of the off-gas from the ethylene plant, said blend being controlled to produce a gas having the approximate heating value of the send-out gas.

8. A process for combining the regasification of a liquefied natural gas, containing methane and hydrocarbons heavier than methane, to produce a send-out gas with the production of ethylene wherein the send-out rate of the gas varies comprising:

(a) partially vaporizing said liquefied natural gas;
(b) introducing said partially vaporized gas into a fractionation zone wherein a fraction primarily comprised of methane is separated from the heavier hydrocarbons as the send-out gas;
(c) recovering the ethane fraction from the heavier hydrocarbons;
(d) passing a fixed quantity of said ethane to an ethylene plant wherein ethylene, an off-gas and by-products are recovered; and
(e) blending at least a portion of any ethane in excess of the fixed quantity of ethane with at least a portion of the ethylene plant off-gas, said blending being controlled to produce a gas having the approximate heating value of the send-out gas.

9. The process as claimed in claim 8, wherein the fixed quantity of ethane corresponds to the quantity of ethane recovered from the liquefied natural gas at the minimum send-out rate.

10. The process as claimed in claim 9, and additionally comprising utilizing the remaining portion of said off-gas as fuel in said ethylene plant.

11. The process as claimed in claim 9, and additionally comprising utilizing a portion of said excess ethane as fuel in said ethylene plant.

12. The process as claimed in claim 9, wherein refrigeration requirements of said ethylene plant are supplied by the cold potential of said natural gas recovered from said revaporization step.

13. The process as claimed in claim 9, and additionally comprising blending a portion of said propane and heavier fraction with a portion of said off-gas to provide a gas having the approximate heating value of the send-out gas.

14. The process as claimed in claim 9, and additionally comprising utilizing at least a portion of said propane and heavier fraction as fuel in said ethylene plant.

15. The process as defined in claim 9 and additionally comprising utilizing the remaining portion of said off-gas and a further portion of any excess ethane as fuel in said ethylene plant, said further portion of said excess ethane being utilized in an amount to replace heat value-wise the amount of ethylene plant off-gas blended with ethane to produce the gas having the approximate heating value of the send-out gas.

References Cited

UNITED STATES PATENTS

| | | | |
|---|---|---|---|
| 2,340,778 | 2/1944 | Steward et al. | 260—683 |
| 2,498,806 | 2/1950 | Hachmuth | 260—683 |
| 2,952,984 | 9/1960 | Marshall | 62—27 |
| 2,672,489 | 3/1954 | Holland | 260—683 |
| 3,456,032 | 7/1969 | Kniel | 260—683 |

DELBERT E. GANTZ, Primary Examiner

C. E. SPRESSER, JR., Assistant Examiner

U.S. Cl. X.R.

48—197; 62—27, 28; 260—676, 677